US008003067B2

(12) United States Patent
Curry et al.

(10) Patent No.: US 8,003,067 B2
(45) Date of Patent: Aug. 23, 2011

(54) APPARATUS AND METHODS FOR AMBIENT AIR ABATEMENT OF ELECTRONIC MANUFACTURING EFFLUENT

(75) Inventors: Mark W. Curry, Morgan Hill, CA (US); Barry Page, San Jose, CA (US); Shaun W. Crawford, San Ramon, CA (US); Robbert Vermeulen, Pleasant Hill, CA (US); William D. Pyzel, Santa Clara, CA (US); Youssef Loldj, Sunnyvale, CA (US); Rene T. Correa, San Jose, CA (US); Daniel S. Brown, Santa Clara, CA (US); Allen Fox, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 552 days.

(21) Appl. No.: 12/053,480

(22) Filed: Mar. 21, 2008

(65) Prior Publication Data

US 2009/0078656 A1      Mar. 26, 2009

Related U.S. Application Data

(60) Provisional application No. 60/973,977, filed on Sep. 20, 2007.

(51) Int. Cl.
*B01D 53/74* (2006.01)
(52) U.S. Cl. ........ 423/210; 422/168; 422/169; 422/171; 422/172; 422/173; 422/174; 422/177; 422/194; 422/207; 431/5

(58) Field of Classification Search .................... 55/223, 55/257.1, 385.1, 431, 522; 95/225, 227; 406/46, 48, 193; 422/168, 169, 171–174, 422/177, 194, 207; 423/210, 215.5, 240 R, 423/219; 261/112.1; 431/5
See application file for complete search history.

(56) References Cited

U.S. PATENT DOCUMENTS

| 4,506,595 | A | * | 3/1985 | Roberts et al. ................ 454/187 |
| 4,530,272 | A | * | 7/1985 | Stokes ........................... 454/187 |
| 4,693,175 | A | * | 9/1987 | Hashimoto .................... 454/187 |
| 5,891,711 | A |   | 4/1999 | Carter |
| 5,955,037 | A | * | 9/1999 | Holst et al. .................... 422/171 |
| 6,321,637 | B1 | * | 11/2001 | Shanks et al. .................. 95/273 |
| 6,328,776 | B1 | * | 12/2001 | Shanks et al. ................ 55/385.2 |
| 6,333,010 | B1 | * | 12/2001 | Holst et al. .................... 422/171 |
| 6,419,455 | B1 | * | 7/2002 | Rousseau et al. ............... 417/36 |
| 6,527,828 | B2 |   | 3/2003 | Flippo |
| 6,767,387 | B2 |   | 7/2004 | Yeh |
| 6,777,355 | B2 | * | 8/2004 | Kisakibaru et al. ........... 438/800 |
| 7,214,349 | B2 | * | 5/2007 | Holst et al. .................... 422/169 |
| 7,591,867 | B2 | * | 9/2009 | Choi et al. ................... 55/385.2 |

(Continued)

OTHER PUBLICATIONS

International Search Report and Written Opinion dated Nov. 28, 2008 relating to International Application No. PCT/US08/77082.

(Continued)

*Primary Examiner* — Duane Smith
*Assistant Examiner* — Minh-Chau Pham
(74) *Attorney, Agent, or Firm* — Dugan & Dugan, PC (57) ABSTRACT

An abatement system is provided which includes 1) an abatement unit adapted to abate effluent; and 2) an ambient air supply system. The ambient air supply system includes an air moving device, wherein the ambient air supply system is adapted to supply ambient air to the abatement unit for use as an oxidant. Numerous other aspects are provided.

13 Claims, 6 Drawing Sheets

U.S. PATENT DOCUMENTS

| | | | |
|---|---|---|---|
| 7,695,700 B2* | 4/2010 | Holst et al. | 423/210 |
| 2004/0001787 A1 | 1/2004 | Porshnev et al. | |
| 2004/0021372 A1* | 2/2004 | Arno et al. | 423/240 R |
| 2004/0213721 A1 | 10/2004 | Arno et al. | |
| 2005/0132677 A1* | 6/2005 | Bauer et al. | 55/385.2 |
| 2005/0160706 A1* | 7/2005 | Kim et al. | 55/385.2 |
| 2007/0021228 A1* | 1/2007 | Holst et al. | 423/240 R |
| 2007/0086931 A1* | 4/2007 | Raoux et al. | 422/168 |
| 2007/0113527 A1* | 5/2007 | Song et al. | 55/471 |
| 2007/0212288 A1 | 9/2007 | Holst et al. | |
| 2007/0256704 A1 | 11/2007 | Porshnev et al. | |
| 2009/0148339 A1* | 6/2009 | Curry et al. | 422/4 |
| 2009/0216061 A1* | 8/2009 | Clark et al. | 588/313 |
| 2009/0246105 A1* | 10/2009 | Clark et al. | 423/219 |
| 2011/0017140 A1* | 1/2011 | Bailey et al. | 118/724 |

OTHER PUBLICATIONS

International Search Report and Written Opinion dated Jan. 12, 2009 relating to International Application No. PCT/US08/83712.

International Preliminary Report on Patentability and Written Opinion relating to International Application No. PCT/US2008/077082 mailed Apr. 1, 2010.

International Preliminary Report on Patentability and Written Opinion relating to International Application No. PCT/US08/83712 mailed May 27, 2010.

* cited by examiner

APPARATUS AND METHODS FOR AMBIENT AIR ABATEMENT OF ELECTRONIC MANUFACTURING EFFLUENT

RELATED APPLICATIONS

The present application claims priority to U.S. Provisional Patent Application Ser. No. 60/973,977, filed Sep. 20, 2007 and entitled "METHODS AND APPARATUS FOR USING AMBIENT AIR DURING ABATEMENT OF SEMICONDUCTOR DEVICE MANUFACTURING EFFLUENTS", which is hereby incorporated herein by reference in its entirety for all purposes.

FIELD OF THE INVENTION

The present invention relates to electronic device manufacturing, and more specifically to hazardous and/or undesirable compound abatement systems which use ambient air as an oxidant.

BACKGROUND OF THE INVENTION

Conventional electronic device manufacturing effluent abatement systems typically use clean dry air ("CDA") as an oxidant. CDA, as the name implies, may be air which has been dried and highly filtered, and there is a cost associated with the preparation of CDA. In an electronic device manufacturing facility, CDA is typically supplied throughout the facility at a relatively high pressure, which can be about 90 psi, more or less. For use in a particular electronic device manufacturing facility system, such as an abatement system, the pressure of the facility CDA may then be reduced to a pressure required by the particular system.
Pressurization of CDA requires equipment and energy. Reduction of CDA pressure requires at least equipment.

Accordingly, methods and apparatus for reducing the costs associated with the use of CDA in an abatement unit are desirable.

SUMMARY OF THE INVENTION

In one aspect an abatement system is provided which includes 1) an abatement unit adapted to abate effluent; and 2) an ambient air supply system comprising an air moving device, wherein the ambient air supply system is adapted to supply ambient air to the abatement unit for use as an oxidant In another aspect, a system for supplying ambient air to an abatement unit for use as an oxidant is provided, which includes 1) an air moving device; and 2) a manifold coupled to the air moving device and adapted to supply air to the abatement unit, wherein the air moving device and the manifold are adapted to receive air from a source of ambient air.

In yet another aspect, a method of abating effluent using ambient air as an oxidant is provided which includes 1) providing an abatement unit adapted to abate effluent from an electronic device manufacturing process tool; 2) providing an ambient air supply system which comprises an air moving device, wherein the ambient air supply system is adapted to provide ambient air to the abatement unit; and 3) abating effluent within the abatement unit with the ambient air supplied by the ambient air supply system. Numerous other aspects are provided in accordance with these and other aspects of the invention. Other features and aspects of the present invention will become more fully apparent from the following detailed description, the appended claims and the accompanying drawings.

DETAILED DESCRIPTION

Electronic device manufacturing processes use a variety of reagents, and some reagents may pass through process tools unused. These unused reagents, if they are simply routed through a facility exhaust system, may be harmful to the environment, or pose a fire or explosion risk. In addition, electronic device manufacturing processes may create byproducts which pose similar harm or risks. For ease of reference, harmful, toxic, flammable and/or explosive, unused-reagents and byproducts may be referred to herein as 'undesirable effluent' or merely 'effluent'.

To avoid harm to the environment, and risk to employees and the public, the electronic device manufacturing industry has embraced the abatement of undesirable effluent. Abatement of undesirable effluent may take many forms, but ultimately abatement transforms undesirable effluent into non- or less harmful or risky materials. One method of abating undesirable effluent is to oxidize the effluent in an abatement reactor or unit using an oxidant such as oxygen. A ready source of oxidant which has been used for abatement units is CDA, which may usually be obtained from a facility CDA source.

Because of its expense, however, the use of CDA is being budgeted or limited in many facilities. For example, some facilities may only budget or allow a conventional abatement system to use about 360 standard liters per minute (slm) of CDA. Some conventional abatement systems, however, may require 1000 slm or more of CDA to abate effluent. For example, processes for the manufacture of solar panels may exhaust large amounts of unused hydrogen and silane reagents. These large volumes of flammable and/or explosive gases require large volumes of oxidant to abate. Thus, the conventional abatement system may not comply with the CDA budget requirements of some facilities and therefore may not be selected by the customer.

As described above, facility CDA is routed through the facility under pressure, typically at a pressure high enough to satisfy the needs of a facility system which has the highest pressure requirement of all of the facility systems. This pressure may be about 90 psi, more or less. For use in all other facility systems, including abatement systems (which may use up to about 45% to 80% percent of all of the CDA produced in a facility), the pressure of the CDA need not be so high. Pressurizing CDA for transport unnecessarily raises the cost of operating the abatement unit, because the abatement unit does not need air at such a high pressure. Similarly, drying the CDA for use in an abatement unit, where oxidant is not required to be dry, unnecessarily raises the cost of operation. It is thus desirable to operate abatement units while avoiding the costs associated with drying, highly filtering and compressing air.

In some embodiments, the present invention may reduce or avoid the use of CDA by providing ambient air to abatement units through an ambient air supply system. Ambient air may be obtained inside the room which houses the abatement unit, or from another space within the facility. Other sources of suitable ambient air may be employed such as air from outside the plant, or recycled facility air, for instance.

In some embodiments of the present invention, air may be supplied to an abatement unit by a naturally aspirated air system (NAAS) or the like. A NAAS is a system which allows the abatement unit to draw ambient air into the abatement unit, but which does not actively move the air. The NAAS may include an inlet that is open to ambient air, which is at about atmospheric pressure, and an outlet that may be coupled to the abatement system (and/or subsystems of the abatement system). In these embodiments, the abatement system may be operated at a pressure below atmospheric pressure. For example, the pressure inside the reactor may be about −1.2" to −5" of water (or another suitable pressure) relative to atmospheric pressure. In such a case, the air may naturally be drawn into the abatement system and/or subsystems by the pressure differential between the ambient air and the gas inside the abatement unit. In this manner, oxygen may be supplied to the reactor from the ambient air. Ambient air may be at other pressures, including below and above atmospheric pressure. For a NAAS to be effective, the pressure differential should be large enough such that air is drawn into the abatement unit at a rate which provides enough oxygen to abate the effluent flowing through the abatement unit to a desired level of abatement.

In other embodiments a NAAS may be unable to provide all of the air required to abate the effluent to a desired degree. One way to abate the effluent to a desired degree of abatement is to flow a minimum amount of air into the abatement unit. This minimum amount of air may be readily determined by evaluating the nature of the effluent to be abated, and the mass flow rate of the effluent to be abated. If the difference between the pressure of the ambient air and the operating pressure of the abatement unit is too small, not enough air will be drawn into the abatement unit to effectively abate the effluent. In such a case, more air must be pushed or pulled into the abatement unit. In these other embodiments the ambient air supply system may incorporate an air moving device, such as an air blower or amplifier, to push and/or pull sufficient air into the abatement system and/or its subsystems.

In yet other embodiments, despite the fact that a sufficient pressure differential may exist between the ambient air and the abatement unit (i.e., sufficient to draw enough air into the abatement unit to effectively abate the effluent), the ambient air supply system may still incorporate an air moving device, such as an air blower or amplifier, to push and/or pull air into the abatement unit. Incorporating such an air moving device into the ambient air supply system may alleviate any temporary shortages of ambient air which may be caused by a temporary change in the operating pressure of the abatement unit or the pressure of the ambient air.

Figure 1:
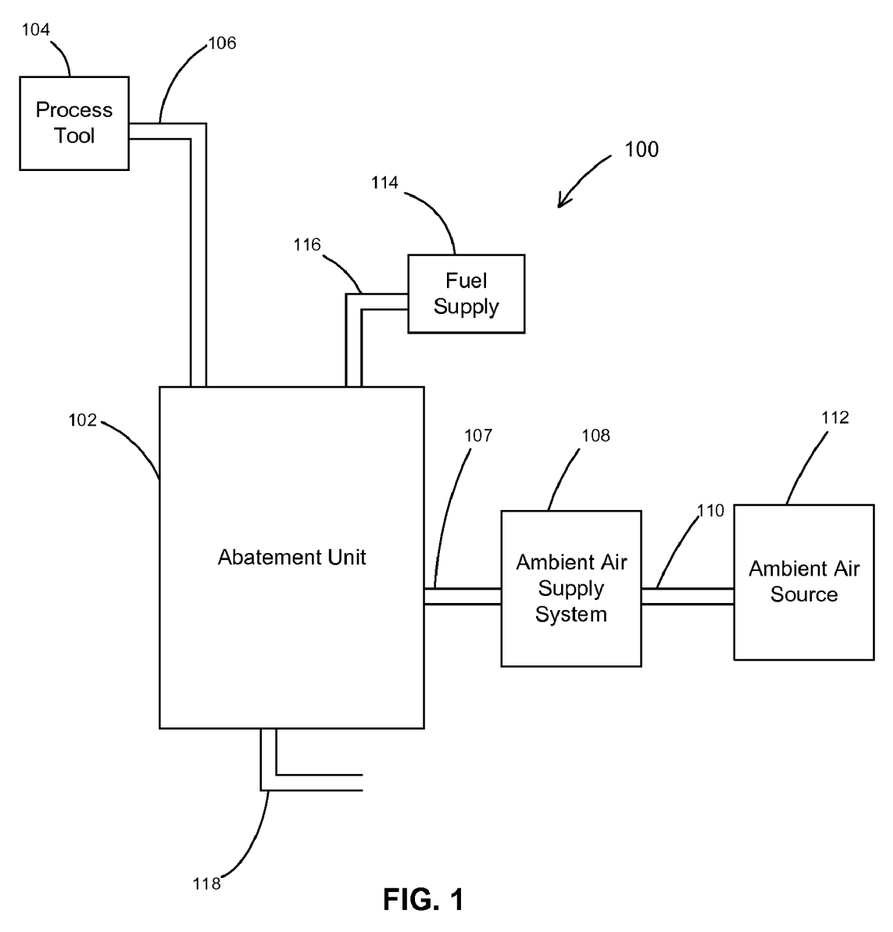
FIG. 1 is a schematic depiction of an abatement system of the present invention.

FIG. 1 is a schematic diagram of an exemplary ambient air abatement system 100 of the present invention. The abatement system 100 may include an abatement unit 102 which may be adapted to abate effluent which has been exhausted from one or more process tools 104. Effluent may flow from process tool 104 through conduit 106 to abatement unit 102. Abatement unit 102 may be adapted to abate the effluent by reacting the effluent with oxygen. The oxygen may be provided to the abatement unit 102 as a component of ambient air which may be supplied to the abatement unit 102, through conduit 107, by ambient air supply system 108. Ambient air supply system 108 may be connected through ambient air inlet 110 to ambient air source 112 from which ambient air supply system 108 may draw ambient air. Although only one ambient air supply system 108 is depicted, more than one, e.g., 2, 3, 4 or more, may be utilized. In some embodiments, abatement unit 102 may burn fuel in order to generate temperatures at which effluent will react with oxygen. Therefore, abatement unit 102 may be coupled to a fuel supply 114 through conduit 116. The abated effluent may exhaust from abatement unit 102 through outlet 118, from where it may pass to the atmosphere or to additional abatement devices, such as a point of use or house scrubber.

The abatement unit 102 may be a reactor that is adapted to process the effluent. Such a reactor may be, for example, a fuel burning thermal abatement unit such as a Marathon Abatement System manufactured by Applied Materials, Inc. of Santa Clara, Calif. Alternatively, the abatement unit may be electrically heated, or heated by any suitable method. In some cases the abatement unit may not need to be heated in order to abate the effluent, such as when the effluent is itself flammable.

The process tool 104 may be a system that includes process chambers (not shown) which produce the effluent that is abated by the abatement unit 102. For example, the process tool 104 may be a deposition chamber or any other processing chamber which exhausts effluent which may be abated by abatement unit 102. In a solar panel manufacturing facility, the process chambers may exhaust large quantities of hydrogen and/or silane.

As discussed above, the ambient air supply system 108 may supply ambient air to the abatement unit 102 from the ambient air source 112. The structure and operation of ambient air supply system 108 will be described in more detail below with reference to FIGS. 3 and 4.

The ambient air source 112 may be ambient air that surrounds the abatement system 100, although any suitable source of air may be employed. For example, the air may be ambient air that is filtered by HEPA filters commonly found in manufacturing facilities. Such air may or may not need to be filtered again prior to conveying the air to the abatement unit 102. In such an embodiment, the ambient air supply system 108 may be coupled to the frame of the ambient air abatement system 100 such that an inlet of the ambient air supply system 108 is open to the ambient air surrounding the abatement system 100. Alternatively, the ambient air source 112 may be air that is supplied from outside of the facility. In such an embodiment, the ambient air supply system 108 may include a system of tubes or other conduits that are adapted to convey air from outside the facility to the abatement unit 102 in an amount sufficient to effectively abate the effluent. As used herein, it is to be understood that the term 'air' places no limitation on the temperature, pressure, composition, etc. of the gaseous compounds that are supplied by the ambient air source 112. For example, it is to be understood that the term 'air' may include any composition of oxygen, nitrogen, etc. that is commonly found in the atmosphere, although any suitable source of gaseous compounds may be used.

Fuel supply 114 may supply fuel alone or a fuel and air mixture to abatement unit 102. The fuel may be hydrogen, methane, natural gas, methane or LPG, although any suitable fuel may be employed. The pressure of the fuel supplied to the abatement unit 102 may be about 0.2 psi to about 10 psi, although any suitable pressure may be employed. The fuel supply 114 may be coupled to the abatement unit 102 with, for example, stainless steel tubes adapted to convey fluids, although any suitable means of conveying the fuel may be employed. It is to be understood that embodiments provided in accordance with the present invention may not necessarily be coupled to the fuel supply 114. For example, the abatement unit 102 may be a fuel-less reactor (e.g., where the effluent is flammable and only needs an ignition source and a source of air).

In some embodiments, the abatement unit 102, and/or any portions of the ambient air abatement system 100 (excluding the fuel supply 114), may be operated at a pressure that is lower than the pressure of the ambient air source 112, creating a pressure differential or delta. It should be noted that although process tool 104 appears in FIG. 1, it does not form a part of the abatement system 100. This pressure differential may cause ambient air to flow naturally through ambient air supply system 108 into abatement unit 102. If the pressure differential is large enough, sufficient ambient air may be drawn through the ambient air supply system 108 and into the abatement unit 102. The operation of the ambient air supply system 108 will be discussed in more detail below.

In other embodiments, the abatement unit 102, and/or any portions of the abatement system 100, may be operated at a pressure that is too high to create a pressure differential which would move sufficient air from the ambient air source 112 through the ambient air supply system 108 into the abatement unit 102, as described above. In such embodiments, the ambient air supply system 108 may include an air moving device such as an air blower or an air amplifier, as discussed in more detail below with reference to FIGS. 4 and 5.

In still further embodiments, the abatement unit 102 may be operated at a pressure that is lower than the pressure of the ambient air in the ambient air source 112, and yet an insufficient amount of air may be move from the ambient air source 112 through the ambient air supply system 108 and into abatement unit 102. This may be due to the nature and volume of the effluent flowing through the abatement unit 102. In such cases, the ambient air supply system 108 may also include an air moving device such as an air blower or an air amplifier.

In yet further embodiments, although the abatement unit 102 may be operated at a pressure that is sufficiently lower, on average, than the pressure of the ambient air source 112 to move sufficient ambient air through the ambient air supply system 108 into the abatement unit 102, there may be fluctuations in the operating pressure of the abatement unit 102 which cause temporary insufficient flows of air into the abatement unit 102. This may result in unacceptable amounts of unabated effluent exiting the abatement unit 102. In these embodiments, the ambient air supply system 108 may also include an air moving device such as an air blower or an air amplifier, to even out the flow of air into the abatement unit 102.

Figure 2:
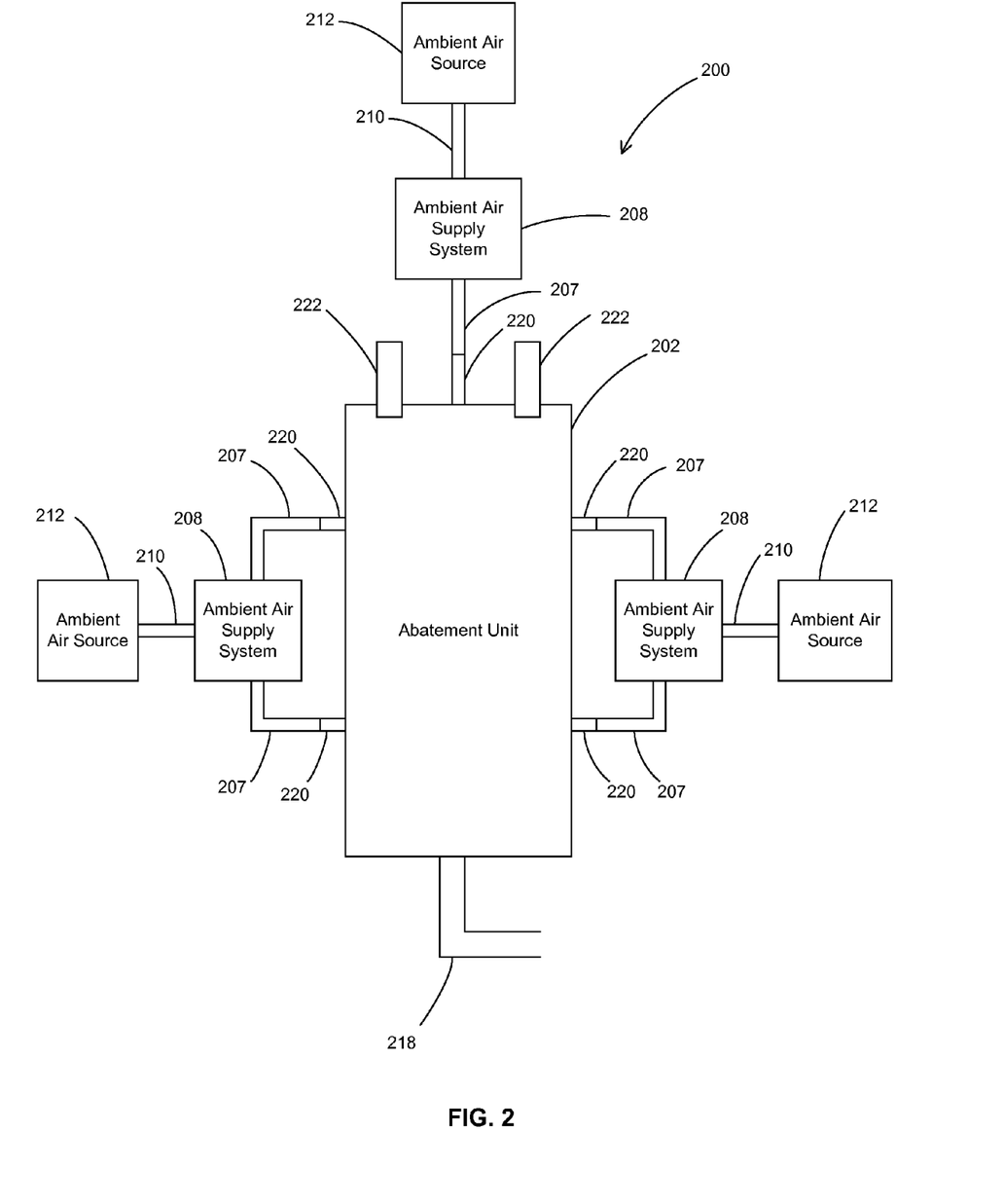
FIG. 2 is a schematic depiction of a second embodiment of the abatement system of FIG. 1.

Abatement system 200, shown in FIG. 2 is a an alternate embodiment of the abatement system 100 of FIG. 1. Reference numbers in FIGS. 1 and 2 correspond to each other for ease of reference. For example, the abatement unit in FIG. 1 has the reference number 102, and the abatement unit in FIG. 2 has the reference number 202.

Ambient air abatement system 200 is similar to abatement system 100, but has the following differences. The ambient air supply system 208 of abatement system 200 is connected to abatement unit 202 through five conduits 207, whereas the ambient air supply system 108 of abatement system 100 is connected to abatement unit 102 through one conduit 107. Furthermore, conduits 207 are, in turn, connected to abatement unit 202 through five ambient air inlets 220. Although five conduits 207 and ambient air inlets 220 are shown, fewer or more than five conduits 207 and ambient air inlets 220 may be used. The placement of air inlets on opposite sides, or symmetrically around, an abatement unit, as shown in FIG. 2, may result in a more uniform combustion zone within the abatement unit 202.

In addition, abatement system 200 is depicted as having three separate ambient air supply systems 208, and three separate ambient air sources 212, compared to the single ambient air supply system 108 and the single ambient air source of abatement system 100. It should be noted that any desired number of ambient air supply systems 208 and ambient air sources 212 may be employed in the practice of the present invention. Thus, there may be n air inlets 220, which may be supplied with ambient air by n or fewer than n ambient air supply systems 208. Conversely, n air inlets 220 may be supplied with ambient air by more than n ambient air supply systems 208. The air inlets 220 may be designed such that each has an inner orifice diameter which has been selected to flow a desired mass of air per unit time, when supplied with ambient air at a selected pressure by the ambient air supply system 208. Alternatively, each air inlet 220 may be the same size as each other air inlet 220. In order to get the desired mass flow rates in such a case, the ambient air supply system 208 may be designed, as discussed in more detail below, to provide individually selected mass flow rates of air to each air inlet 220, or air at individually selected pressures to each air inlet 220.

In operation, abatement unit 202 may receive effluent through effluent inlets 222 at the top of the abatement unit 202. Inside the abatement unit 202, surrounding each effluent inlet 222, there may be a plurality of burner jets (not shown). The burner jets may supply heat and flame directed in a downward direction in the abatement unit 202, and the effluent may be abated, e.g., oxidized, as the effluent travels down through the abatement unit 202. In some embodiments, abatement unit 202 may be designed such that it may be desirable to introduce air into the abatement unit 202 at a plurality of locations and at selected, different pressures or mass flow rates at one or more of the locations. For example, in some embodiments, it is desirable to conduct the oxidation reaction at the top of the abatement unit 202 in a fuel rich (i.e., oxygen poor) condition, to be followed, lower in the abatement unit 202, with enough air to create an oxygen rich environment which may be sufficient to effectively abate the remaining unabated effluent. Such a design may help reduce the formation of nitrogen oxides and sulfur oxides. Providing different pressures or mass flow rates at individual air inlets 220 may be accomplished in any suitable fashion, as discussed below with reference to FIGS. 3 and 4.

Figure 3:
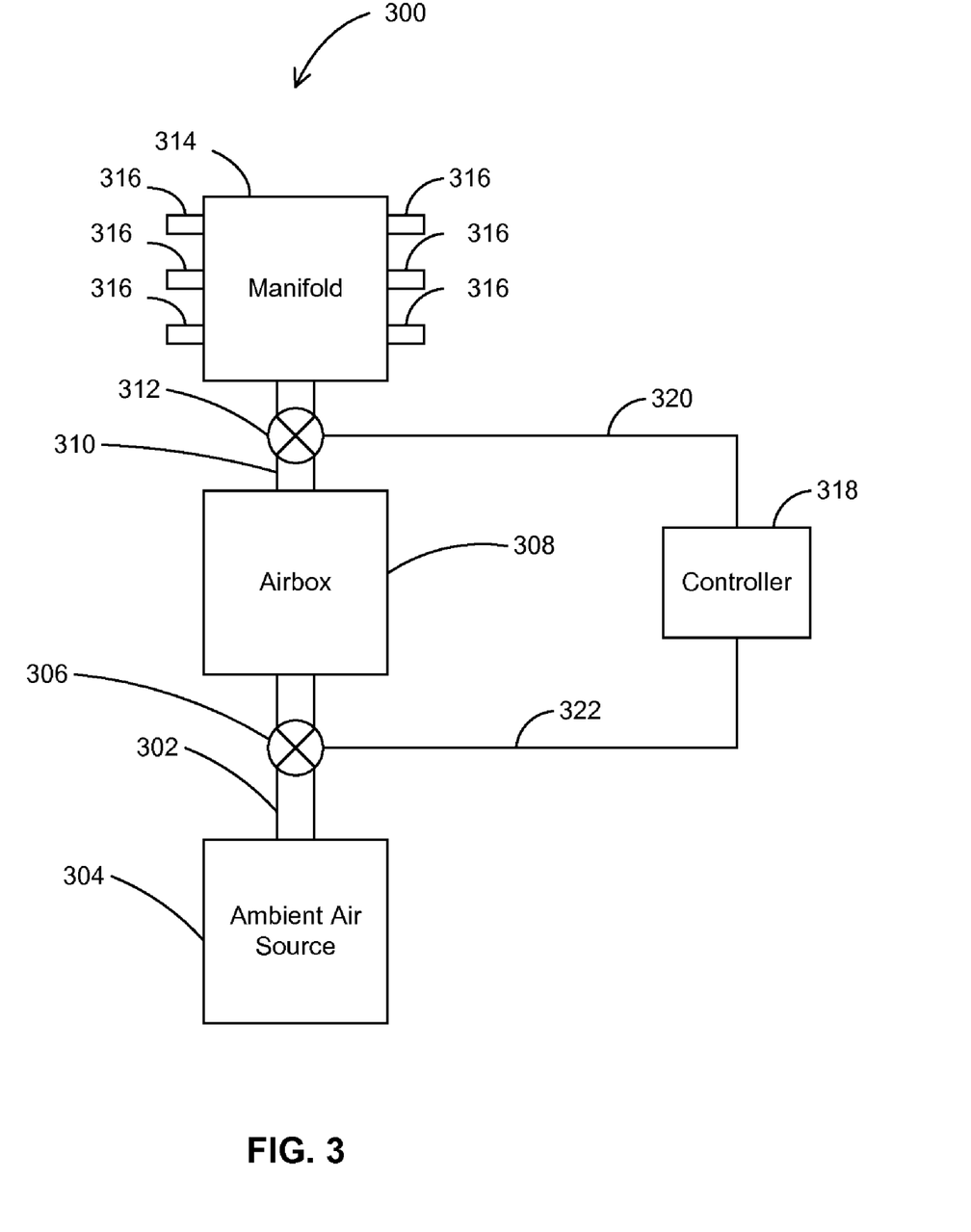
FIG. 3 is a schematic depiction of an ambient air supply system of the present invention.

Ambient air supply system 300, depicted in FIG. 3, corresponds to the ambient air supply system 108 and the ambient air supply system 208 of FIGS. 1 and 2, respectively.

Ambient air supply system 300 may include air intake 302 which may draw ambient air from ambient air source 304. Ambient air may pass through air intake 302, through shut off valve 306 into airbox 308. Ambient air may then pass from airbox 308 through conduit 310 and flow control valve 312 into manifold 314. Manifold 314 may distribute ambient air through ambient air outlets 316 to conduits (not shown) which may transport ambient air to an abatement unit (not shown). Controller 318 may be any microcomputer, microprocessor, logic circuit, a combination of hardware and software, or the like, suitable to control the opening and closing of shut off valve 306 and flow control valve 312 through communications links 320 and 322.

Ambient air source 304 may be any suitable source of ambient air, as described above. Air intake 302 may be a 3 inch stainless steel or PVC vacuum tube, although any suitable conduit of any suitable shape may be used.

Shut off valve 306 may be a gate valve or any valve which is suitable to open and close the ambient air path through air intake 302. As depicted, the shut off valve 306 may be a solenoid or pneumatically actuated gate valve that may be provided by HVH, LLC, although any suitable valve may be employed. The shut off valve 306 may be adapted to open and close such that the air from the ambient air source 304 may be regulated. For example, it may be desired to completely close off the flow of air from the ambient air source 304 to the abatement system. Accordingly, the shut off valve 306 may close (e.g., extend a flat disc to close the air path) so as to prevent the air from being conveyed from the air intake 302 to the air box 308. In this closed state air box 308 may be unable to convey any air from the ambient air source 304 to the abatement system. The shut off valve 306 may also be adapted to prevent effluent from flowing towards the ambient air source 304. For example, the shut off valve 306 may be adapted to close when pressure in the abatement unit increases to an undesired pressure (e.g., atmosphere, a pressure greater than the ambient air pressure, etc.).

Airbox 308 may be an air box, although any suitable containment vessel may be employed. As depicted, the air box 308 may provide a reservoir of air that may serve to dampen fluctuations in air pressure, improving the ability of the Ambient air supply system 300 to control the flow of ambient air. Although the air box 308 is depicted in FIG. 3, it is possible that in some embodiments, the air box 308 may not be employed. Also, as depicted, the air box 308 is a rectangular box, although any suitable shape (e.g., cylindrical, hexagonal, etc.) shape may be employed. The size of airbox 308 may be selected based on factors such as the volume and velocity of ambient air designed to flow through the ambient air supply system 300.

The flow control valve 312 may be a butterfly valve although any suitable valve may be employed. As depicted, the flow control valve 312 may be a solenoid or pneumatically actuated valve that may be controlled by controller 318. The flow control valve 312 may have a flap in the body of the flow control valve 312 that rotates so as to increase or decrease the opening that the air being conveyed from the ambient air source 304 to the abatement system flows through. Thus, the air may be controlled to flow at a higher or lower rate (e.g., standard liters per minute) thereby regulating the flow from the ambient air source 304 to the abatement system.

It should be noted that the functions of shut off valve 306 and flow control valve 312 may be performed by a single valve (not shown), such as a throttling gate valve or a metering shutoff valve. Such multifunction valves are expensive, however, and using one may be a more expensive way to provide these functions.

The manifold 314 may be a box that is employed to distribute the air regulated by the flow control valve 312. As depicted, the manifold 314 is a box with six ambient air outlets 316. Although six ambient air outlets 316 are depicted in FIG. 3, more or fewer may be employed. Also, each ambient air outlet 316 may be coupled to one or more inlets (not shown) on the abatement system. Each ambient air outlet 316 may be sized independently of each other ambient air outlet 316 so that a selected amount of air may be flowed through the ambient air outlet 316 to a particular location in the abatement unit.

In operation, the ambient air supply system 300 embodiment may be useful, as discussed above, in abatement systems which are operated at pressures sufficiently below the pressure of the ambient air source 304 to create a sufficient pressure differential to move enough air through the Ambient air supply system 300 into the abatement unit to effectively abate the effluent. In such a case, the pressure differential between the operational pressure of the abatement unit and the ambient air source 304 may cause sufficient air to flow through the ambient air supply system 300 into the abatement unit. Flow control valve 312 may be used to select the overall amount of air which may be supplied through the ambient air supply system 300 to the abatement unit.

Figure 4:
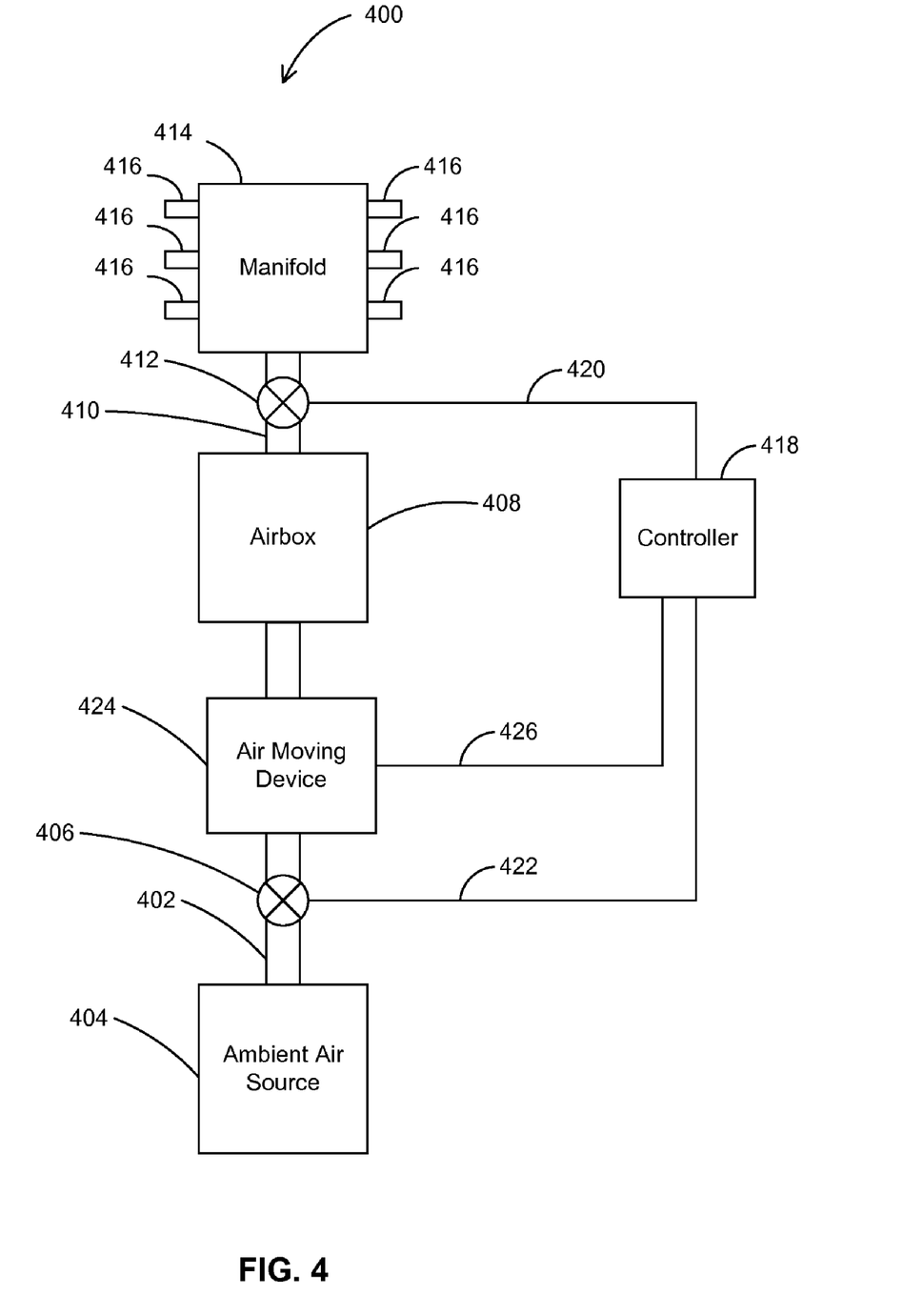
FIG. 4 is a schematic depiction of an alternative embodiment of an ambient air supply system of the present invention.

Ambient air supply system 400, shown in FIG. 4, is similar to the ambient air supply system 300 shown in FIG. 3, with the following differences. Ambient air supply system 400 may include an air moving device 424, which may be an air blower, air amplifier, or any other suitable device for moving air. Controller 418 may control the rate at which air moving device 424 moves ambient air through the ambient air supply system 400.

Air moving device 424 may be any air blower which can move a sufficient mass of air per unit time as may be required by a particular abatement scenario. For example, air moving device 424 may be a squirrel cage fan, a bladed fan, a turbo fan, or a roots blower, etc., although any suitable blower or fan may be used.

In operation, ambient air supply system 400 may be useful in abatement systems of the present invention which are operated at pressures which are too high, i.e., not sufficiently below the pressure of ambient air source 404, to ensure that enough air will move through the ambient air supply system 400 and into the abatement unit to effectively abate the effluent. In other embodiments, even if an abatement system is operated at pressures sufficiently below the pressure of the ambient air source 404 to passively move enough air through the ambient air supply system 400 into the abatement unit to abate the effluent, air moving device 424 may be employed to ensure a constant flow of ambient air despite any pressure fluctuation which may occur in the operating pressure of the abatement unit. Such pressure fluctuation may occur due to fluctuations in the pressure of the house exhaust system which may be a motive force for pulling effluent through the abatement unit.

Figure 5A:
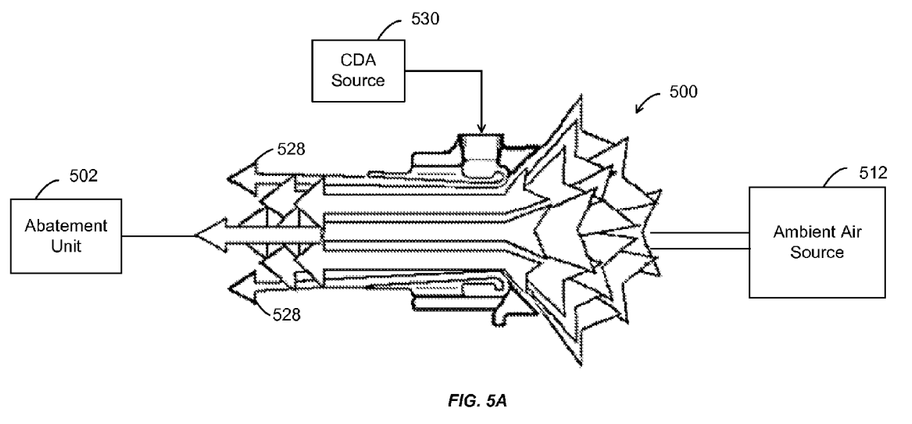
FIGS. 5A and 5B are cross section side views of air amplifiers useful in the present invention.
Figure 5B:
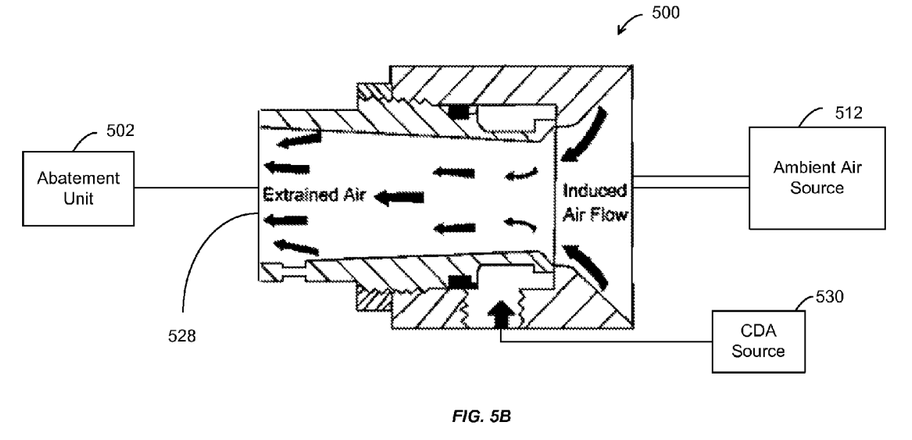

With reference to FIGS. 5A and 5B, air amplifier 500 may be an air amplifier, although any suitable means of pushing and/or pulling air from the ambient air source 512 to the abatement unit 502 may be employed. As depicted, the air amplifier 500 is cylindrical, although any suitable shape may be employed. The air amplifier 500 is depicted as including an inlet that is open to the source of air that is provided by the ambient air source 512. The air amplifier 500 is also depicted as including an outlet that is open to the abatement unit 502. The air amplifier 500 may be comprised of stainless steel, although any suitable material may be employed.

The flow of air provided by the ambient air source 512 is indicated by a plurality of arrows 528 which are inside the air amplifier 500 and which point in a direction from the ambient air source 512 to the abatement unit 502. The air amplifier 500 may be adapted to pull and/or push the air supplied by the ambient air source 512. As depicted, the air supplied by the ambient air source 512 may be pulled through the air amplifier 500 by a supply of the CDA from the CDA source 530. Although CDA is being employed in this embodiment of the ambient air supply system of the present invention, the use of CDA is reduced because a relatively small amount of CDA is used to move a larger volume of air from the ambient air source 512.

Figure 6:
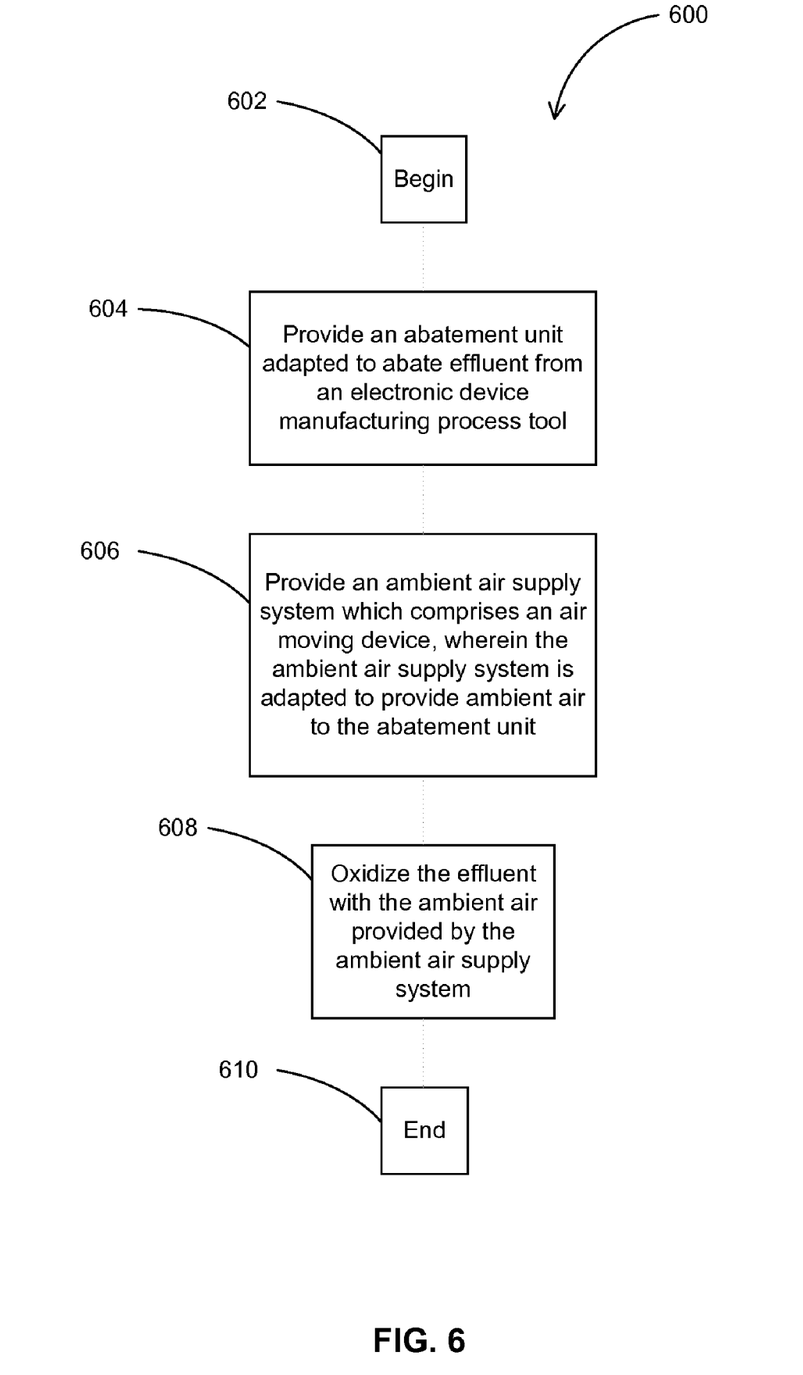
FIG. 6 is a flow chart depicting a method of operating an abatement unit according to the present invention.

A method of abating effluent 600 according to the present invention is provided in FIG. 6. The method begins in step 602 and proceeds to step 604 where an abatement unit adapted to abate effluent from an electronic device manufacturing process tool is provided. The method includes step 606 wherein an ambient air supply system which comprises an air moving device is provided, and wherein the ambient air supply system is adapted to provide ambient air to the abatement unit. Steps 604 and 606 may be performed in any order. The method also includes step 608 in which effluent is oxidized with the ambient air provided by the ambient air supply system. The method ends in step 610.

The foregoing description discloses only exemplary embodiments of the invention. Modifications of the above disclosed apparatus and methods which fall within the scope of the invention will be readily apparent to those of ordinary skill in the art.

Accordingly, while the present invention has been disclosed in connection with exemplary embodiments thereof, it should be understood that other embodiments may fall within the spirit and scope of the invention, as defined by the following claims.

The invention claimed is:

1. An abatement system comprising:
    an abatement unit of the abatement system adapted to abate effluent which has been exhausted from one or more process tools, wherein the effluent flows from the one or more process tools to the abatement unit via a conduit; and
    an ambient air supply system adapted to supply ambient air to the abatement unit of the abatement system for use as an oxidant in the abatement unit to abate the effluent, the ambient air supply system comprising:
        an air moving device including a blower; and
        a manifold adapted to transport ambient air from the ambient air supply system through more than one air inlet to the abatement unit;
    wherein the ambient air supply system is adapted to flow the ambient air through each air inlet at a selected mass flow rate, and wherein the mass flow rate selected for each air inlet may be the same as or different from the mass flow rate selected for any other air inlet.

2. The abatement system of claim 1 wherein the ambient air supply system is adapted to supply ambient air to the abatement unit at a selected mass flow rate.

3. The abatement system of claim 1 wherein the ambient air supply system is adapted to prevent backflow of the effluent through the air supply system.

4. The abatement system of claim 1 wherein the ambient air supply system is adapted to supply the ambient air to the abatement unit at a selected pressure.

5. The abatement system of claim 1 wherein each air inlet comprises an orifice where the diameter of the orifice is selected to allow air to flow into the abatement unit at a selected mass flow rate.

6. The abatement system of claim 5 wherein the mass flow rate selected for each air inlet may be the same as or different from the mass flow rate selected for any other air inlet.

7. The abatement system of claim 4 further comprising an air box, wherein the air box is adapted to reduce pressure fluctuations of the air supplied to the abatement unit.

8. A system for supplying ambient air to an abatement unit of an abatement system for use as an oxidant comprising in the abatement unit:
    an air moving device comprising a blower; and
    a manifold coupled to the air moving device and adapted to supply air to the abatement unit of the abatement system via more than one air inlet, the air for use as an oxidant in the abatement unit to abate effluent exhausted from one or more process tools coupled to the abatement unit;
    wherein the air moving device and the manifold are adapted to receive air from a source of ambient air; and
    wherein the air supply system is adapted to flow the ambient air through each air inlet at a selected mass flow rate, and wherein the mass flow rate of ambient air through each air inlet is the same as or different from the mass flow rate of any other air inlet.

9. The system of claim 8 wherein the ambient air supply system is further adapted to supply ambient air to the abatement unit at a selected mass flow rate.

10. The system of claim 8 wherein the air supply system is further adapted to supply the ambient air to the abatement unit at a selected pressure.

11. The system of claim 10 further comprising an air box adapted to reduce pressure fluctuations of the ambient air supplied to the abatement unit.

12. A method of abating effluent using ambient air as an oxidant comprising:
    providing an abatement unit of an abatement system adapted to abate effluent which has been exhausted from an electronic device manufacturing process tool;
    flowing effluent from the electronic device manufacturing process tool to the abatement unit via a conduit;
    providing an ambient air supply system of the abatement system which comprises an air moving device, wherein the ambient air supply system is adapted to provide ambient air to the abatement unit of the abatement system for use as an oxidant in the abatement unit to abate the effluent; and wherein the air moving device comprises a blower;
    providing a manifold coupled to the air moving device;
    supplying ambient air to the abatement unit through more than one air inlet of the manifold, the air flowed through each air inlet at a selected mass flow rate;
    providing the same or different mass flow rate of ambient air through each air inlet compared to any other air inlet; and
    abating effluent within the abatement unit with the ambient air supplied by the ambient air supply system.

13. A system for supplying ambient air to an abatement unit of an abatement system for use as an oxidant comprising:
    an ambient air source;
    an air moving device having a first end and a second end, wherein the first end is coupled to the ambient air source via a first valve, and wherein the air moving device comprises a blower;
    an air box having a first end and a second end, wherein a first end of the air box is coupled to the second end of the air moving device, the air box adapted to provide a reservoir of ambient air to reduce pressure fluctuations of the air supplied to the abatement unit of the abatement system for use as an oxidant in the abatement unit to abate effluent exhausted from one or more process tools coupled to the abatement unit; and
    a manifold, wherein the manifold is coupled to the second end of the air box via a second valve, and wherein the manifold includes more than one air inlet adapted to supply air to the abatement unit of the abatement system;
    a controller adapted to control the operation of the first and second valves;
    wherein the air moving device and the manifold are adapted to receive air from the source of ambient air;
    wherein the air supply system is adapted to flow the ambient air through each air inlet at a selected mass flow rate, and wherein the mass flow rate of ambient air through each air inlet is the same as or different from the mass flow rate of any other air inlet.

* * * * *